United States Patent Office 3,534,623
Patented Oct. 20, 1970

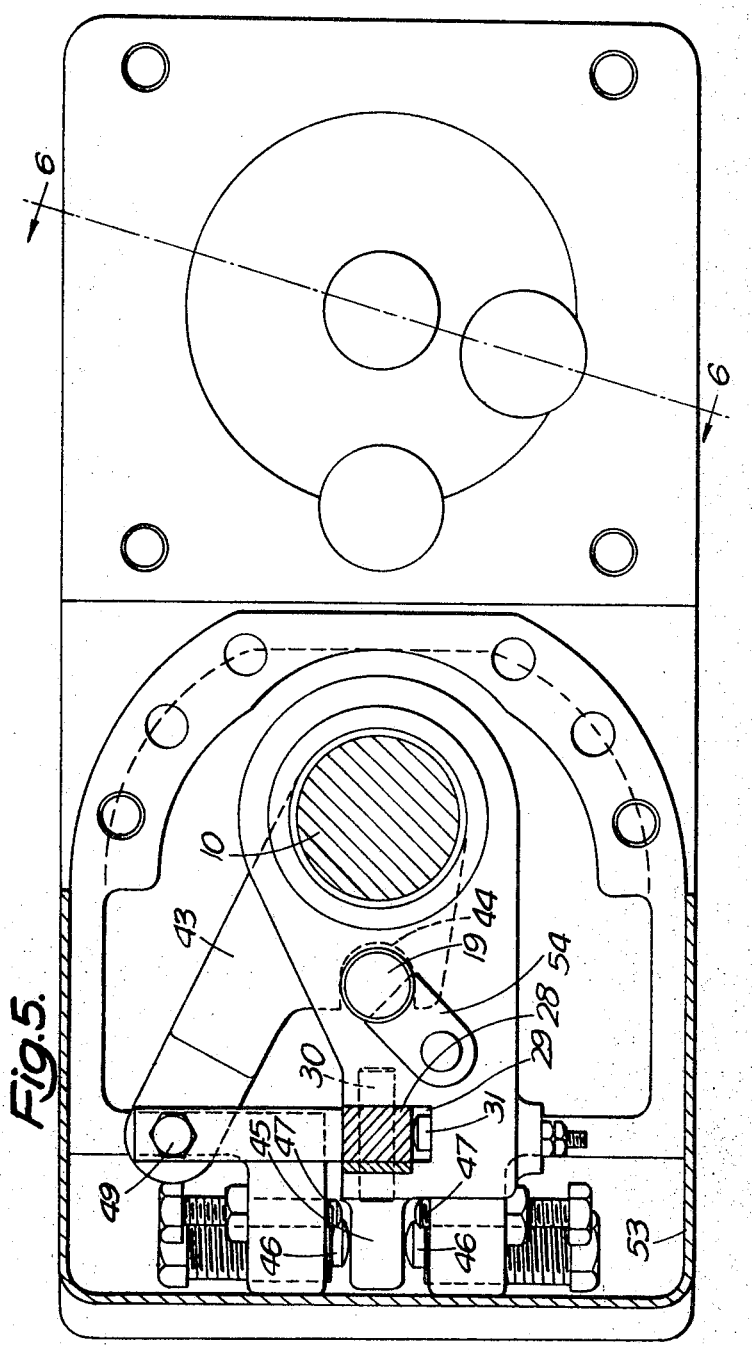

3,534,623
POWER-ASSISTED STEERING MECHANISMS
Cecil Goodacre and Eric Rodgers, Basingstoke, England, assignors to Lansing Bagnall Limited, Basingstoke, England, a British company
Filed Nov. 29, 1968, Ser. No. 779,828
Claims priority, application Great Britain, Nov. 29, 1967, 54,350/67
Int. Cl. B62d 5/02, 5/04; F16f 35/00
U.S. Cl. 74—388                        10 Claims

ABSTRACT OF THE DISCLOSURE

A power-assisted steering mechanism comprises a steering spindle extending between a steering wheel and a steering box, the steering spindle being split into two coaxial parts connected by a gear train so that rotation of the first part will rotate the second part. A reversible electric motor is operable to assist the rotation of the second part of the steering spindle, the said second part being connected to the output shaft of the motor by a second gear train and the operation of the electric motor being controlled in accordance with the torque reaction between members of the gear train connecting the two parts of the steering spindle.

---

This invention relates to power-assisted steering mechanisms for vehicles.

The invention provides a power-assisted steering mechanism comprising a steering spindle split into two coaxial parts connected by a gear train so that rotation of the first part will rotate the second part, a reversible electric motor operable to rotate an output shaft in both directions, a second gear train connecting the output shaft of the electric motor to the second part of the steering spindle whereby rotation of the output shaft by the electric motor will assist the rotation of the second part of the steering spindle, and means for controlling the operation of the electric motor in accordance with the torque reaction between members of the first-mentioned gear train connecting the two parts of the steering spindle.

In a preferred form the said first gear train comprises two coaxial gear wheels of different sizes carried by a shaft which is parallel to the steering spindle, and connected rigidly together, which gear wheels respectively mesh with gear wheels on the two portions of the steering spindle, the said shaft being mounted in a member pivotable against spring means about the axis of the steering spindle, whereby the shaft and the member will be pivoted together about the said axis of the steering spindle in accordance with the torque reaction between the aforesaid gear wheels of the first-mentioned gear train, said pivotable movement controlling the operation of the electric motor. When the mechanism is in this form, it is further preferred that said member carries a magnet which is initially located between and in equally spaced relation with two-pole pieces whereby said pivotal movement of the said shaft and the said member about the axis of the steering spindle will move the magnet towards one or other of the pole-pieces as the said torque reaction varies, movement of the magnet towards one of the pole-pieces operating the motor to drive its output shaft in one direction and movement of the magnet towards the other pole-piece operating the motor to drive its output shaft in the other direction. Preferably, the pivotable movement of the member about the axis of the steering spindle is resisted by limited stops.

Means may be provided for making the electric motor inoperative when the steering spindle is rotated to a position approaching its full lock-position. To provide said means, a portion of the first part of the steering spindle may be provided with a screw thread and the said means for making the electric motor inoperative may comprise a bracket having an internally threaded bore in engagement with the screw thread on the spindle, and being held against substantial pivotal movement about the axis of the steering spindle whereby rotation of the spindle will move the bracket axially of the spindle so that the bracket, when moved in either direction of travel, engages a stop when the steering is near the respective full-lock position, pressure of the bracket on the stop rendering the motor inoperative. In the case of there being a magnet, as described above, it is preferred that the magnet is carried on a bar which bar also carries the aforesaid stops and which is pivotally mounted on the said member in such a manner that when the bracket engages one of the stops, the bar pivots to move the magnet away from the appropriate pole-piece towards its initial or neutral position.

The electric motor may conveniently be a pulse-controlled motor.

The invention also provides a vehicle (e.g. an industrial truck) having a power-assisted steering mechanism as described above.

By way of example, a specific embodiment in accordance with the invention will now be described with reference to the accompanying drawings in which:

FIG. 5 is a section along line 5—5 in FIG. 1, with the electric motor assembly omitted.

Figure 1:
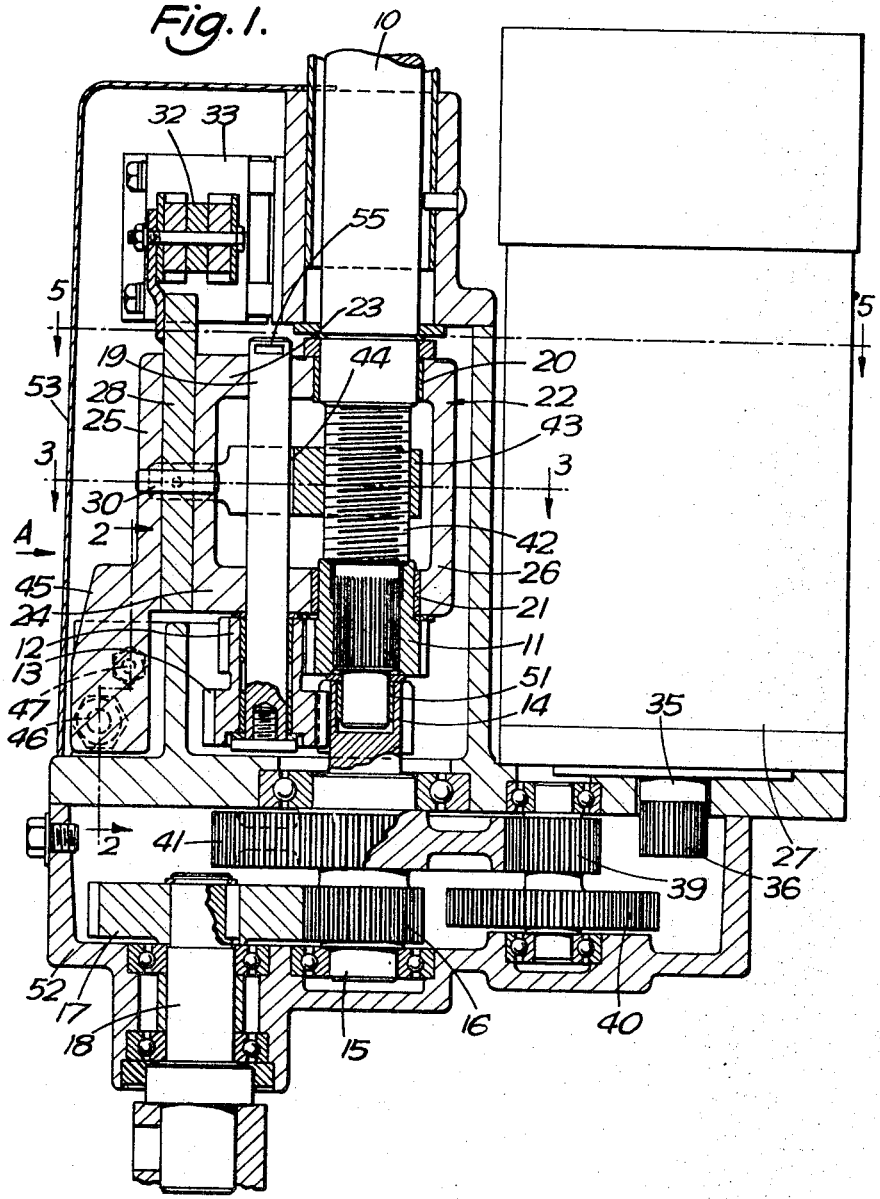
FIG. 1 is as sectional elevation of a power-assisted steering mechanism employing an electric motor assembly, the electric motor assembly being shown in elevation.

The subject of this example is a power-assisted steering mechanism for a vehicle, e.g. an industrial truck, the mechanism being inserted into the construction of the steering spindle intermediate a steering wheel and a steering box.

With reference to the drawings, a steering spindle 10 is linked to its steering box (not shown) by means of gearing comprising a gear 11 carried by the steering spindle adjacent its lower end, and integral gears 12, 13 mounted on a parallel spindle 19, the gear 12 mating with the gear 11 and the gear 13 mating with a further gear 14 mounted on the top end of a third spindle 15 having the same longitudinal axis as the steering spindle. The spindle 15 has an upwardly open bearing 51 for reception of the free end of the steering spindle. The third spindle 15 also carries, adjacent its lower end, a gear 16 which mates with a gear 17 carried by the spindle 18 that actually enters the steering box. In this example, the gear ratio between the gears 11 to 14 is approximately 2:1. The above gearing and the lower portion of the steering spindle are located in an oil-filled gear box 52 and a cover 53.

A pair of bearings are provided for the mounting of each of the aforesaid spindles. The bearings 20, 21 for the lower end of the steering spindle 10 are provided by a member 22 having spaced top and bottom walls 23, 24 interconnected by webs 25, 26. This member 22 is located above the said gear 11, the spindle 19 carrying the integral gears 12, 13, also passing upwardly through close-fitting holes in the said top and bottom walls of the member. The spindle 19 is locked against movement relative to the member 22 by a plate 54 (see FIG. 5) that enters a slot 55 in the spindle 19, the plate being fixed to the top wall 23 of the member 22.

The member 22 is designed to pivot about the axis of the steering spindle 10 as the torque between the gears 11 to 14 increases. The torque between the gears 11 to 14, will cause the gears 12, 13 to rotate about the gears 11, 14 and will in turn effect pivotal movement of the spindle 19 and also of the member 22 about the axis of the steering spindle. This movement of the member 22 actuates a pulse-controlled electric motor located within its housing 27 to drive a second gear train (described in detail below) to assist the rotation of the spindle 15 and hence the rotation of the spindle 18 that actually enters the steering box.

In order to preclude free pivotal movement of member 22 about the axis of the steering spindle, the member is provided with a downwardly projecting portion 45 that is engaged by opposed plungers 46 that are urged by springs 48 into engagement with opposite sides of the portion 45. The pressure applied by each spring 48 is adjustable. Two adjustable stops 47 are also provided to limit the range of movement of the portion 45.

Figure 3:
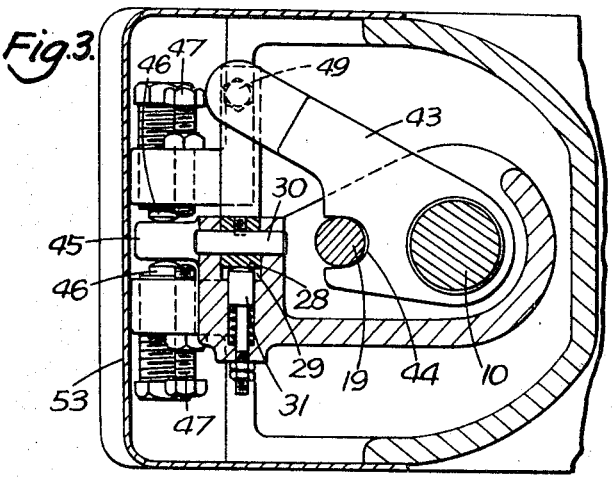
FIG. 3 is a section along line 3—3 in FIG. 1.
Figure 4:
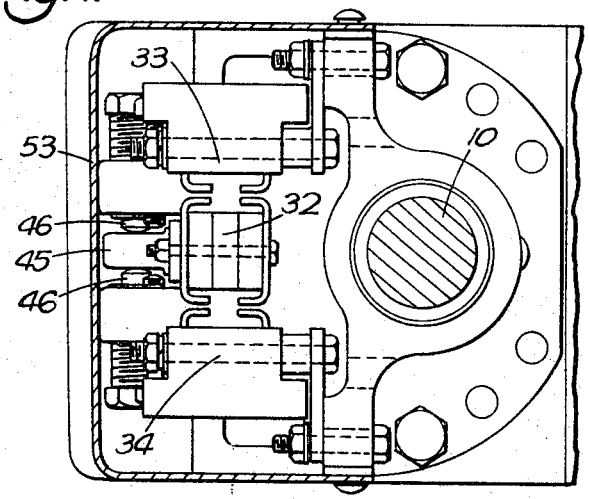
FIG. 4 is a plan view of the mechanism shown in FIG. 1 excluding the electric motor assembly.
Figure 6:
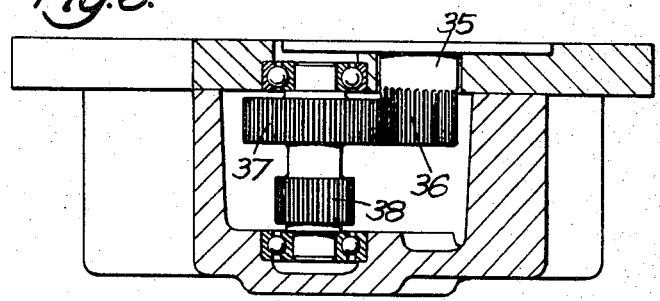
FIG. 6 is a section along line 6—6 in FIG. 5.

The connection between the member 22 and the electric motor will now be described. Carried by the member 22, is a bar 28 extending longitudinally of a recess 29 (see FIG. 3) in the web 25 of the member which bar is located in the recess by a transverse pin 30. Pivotal movement of the bar 28 about the axis of the pin 30 is permitted for the purpose described below, but, initially, the bar is retained in its desired alignment with respect to the recess 29 by a pair of plungers 31 spring-urged into engagement with one side of the bar.

The upper end of this bar 28 carries a magnet 32 located between and in spaced relation with two pole-pieces 33, 34. Pivotal movement of the member 22 and hence of the bar 28 about the axis of the steering spindle will effect movement of the magnet towards one of the pole-pieces. The stops 47 are adjusted so that movement of the member 22 is stopped before the magnet contacts either pole-piece. Each pole-piece 33, 34 is provided with a field-effect resistor and is electrically connected to the pulse-controlled electric motor so that variation in flux between the magnet and one of the pole-pieces will effect the pulse control of the motor to render it operable to rotate an output shaft 35. This output shaft is provided with gear teeth 36 at its free end and comprises the driving member of the above mentioned second gear train for assisting the rotation of the spindle 15 and hence for assisting the steering of the vehicle. This second gear train (see FIGS. 1 and 5) comprises a first pair of integral gears 37, 38, the teeth of the gear 37 mating with the gear teeth 36 on the output shaft 35, a second pair of integral gears 39, 40, the gear 40 mating with the gear 38, and a gear 41 carried by the spindle 15, which gear 41 mates with the afoersaid gear 39. Rotation of the output shaft will thus effect a rotation of the spindle 15. The direction of rotation of the output shaft will depend on the direction of rotation of the rotor of the electric motor and in turn on the direction of pivotal movement of the member 22 and the bar 28, i.e. it will depend on which pole-piece 33, 34 is influenced by the magnet 32.

The portion 42 of the steering spindle 10 which extends between the top and the bottom walls 23, 24 of the member 22, is provided with a screw-thread for engagement with a transverse bracket 43. This bracket 43 has a recess 44 which is in close fitting lateral engagement with the said spindle 19 whereby lateral movement of the bracket relative to the member 22 is precluded. However, rotation of the steering spindle will effect movement of the bracket longitudinally of the portion 42 of the steering spindle in one direction or the other.

Figure 2:
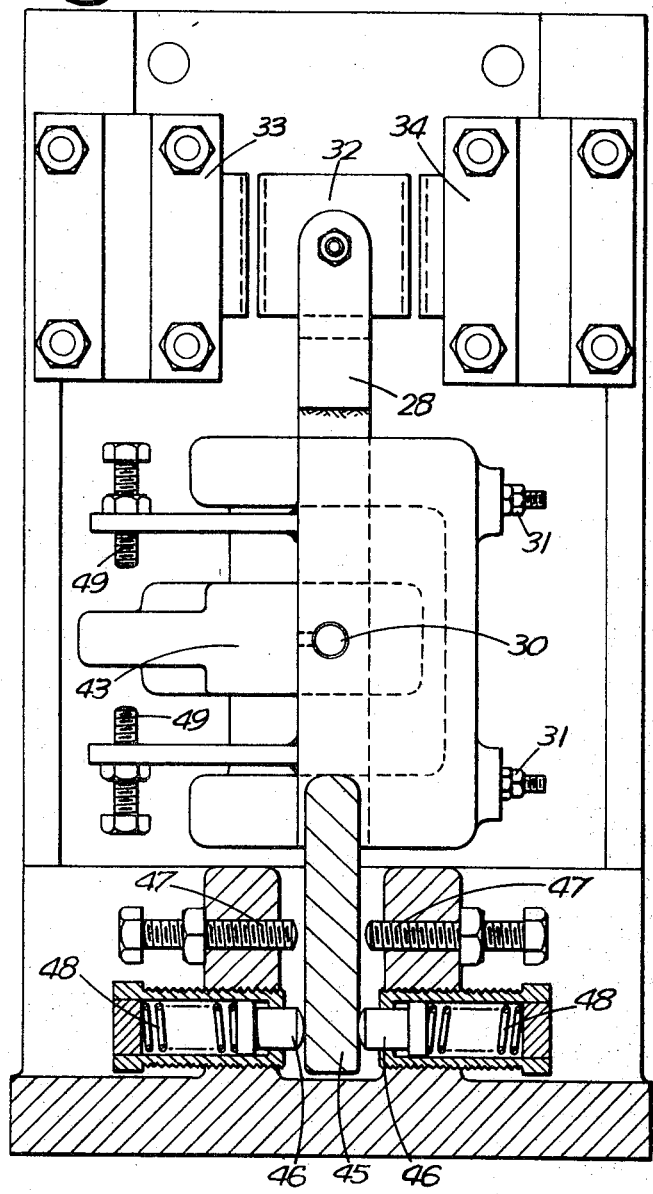
FIG. 2 is an elevation of part of the mechanism as viewed in the direction of arrow A in FIG. 1 with the cover of the mechanism removed, the figure also showing a part section along line 2—2 in FIG. 1.

In the operation of this steering mechanism, it is necessary to be able to cut-out the assistance provided by the electric motor through the second gear train just before the steering spindle and hence the wheels of the vehicle have reached full-lock position. To effect this, the bar 28 carried by the member 22 is provided with limit screws 49 (see FIG. 2) which are set to be engaged by the free end of the bracket 43 just before the required stop position. It will be appreciated that at this point of the operation, the magnet 32 will generally be closer to one of the pole-pieces 33, 34 than the other, by an amount dependent on the steering torque being applied. After the bracket 43 contacts the appropriate limit screw 49, depending on the direction of rotation of the steering spindle, further rotation of the steering spindle will cause further movement of the bracket 43 and hence pivotal movement of the bar 28 about the axis of the pivot pin 30 and relative to the member 22, in a direction which will move the magnet away from the respective pole-piece. The bar 28 and the magnet 32 are thus returned to their neutral position, i.e. a central position between the pole-pieces, and the motor becomes non-operative until the steering spindle is rotated in the other direction. As soon as this occurs, the magnet 32 will move towards the other pole-piece so making the electric motor and the second gear train operative.

In operation, rotation of the steering spindle 10, in one direction or the other, will rotate the spindle 18 that enters the steering box. As the torque between the gears 11 to 14 rises, the member 22 will be pivoted about the axis of the steering spindle causing the magnet 32 to move towards one of the pole-pieces 33, 34 and hence render the pulse-controlled electric motor operative. The electric motor will rotate its ouput shaft 35, and, by means of the second gear train, assist the rotation of the spindle 15 and hence the spindle 18 that enters the steering box. The electric motor will continue to give this assistance until the torque reaction between the gears 11 to 14 of the first gear train is reduced sufficiently due to a lighter steering force being applied, or until the steering spindle has been rotated to a position which approaches its full-lock position. In the latter case, the bracket 43 will have moved along the threaded portion 42 of the steering spindle to make contact with one of the limit screws 49 carried by the bar 28. Further rotation of the steering spindle and hence movement of the bracket 43 in the same direction effects a return pivotal movement of the bar 28 relative to the member 22, as described in detail above, the magnet returning to its neutral position. Rotation of the steering spindle in the opposite direction to that in which it was rotated before will effect pivotal movement of the member 22 in the opposite direction and hence movement of the magnet towards the other pole-piece.

The above-described steering mechanism is thus power-assisted as the torque rises between the gears 11 to 14 and it remains operable, according to the steering requirements, until the steering spindle is rotated to its full-lock position.

An advantage of the above-described system over known power-assisted systems is that the power unit e.g. pump or motor, of known systems is working continuously with the consequential use of power and wear in the components. In a system according to this invention, the power unit is only brought into operation as required by the steering requirements so that, in the case of battery powered vehicles, there is a resultant saving of power, as well as wear.

The invention is not restricted to the specific details of the above-described steering mechanism. For example, the gear train 16, 17 may be omitted, in which case the spindlle 15 comprises the spindle that enters the steering box (not shown).

Also, the steering box may comprise a single ring gear only, the ring gear being engaged by the pinion 16 or a pinion carried on the lower end of the spindle 18, and being mounted for direct rotation with the ground wheel or wheels to be steered.

We claim:

1. In a power-assisted steering mechanism a steering spindle split into two coaxial parts connected by a gear train so that rotation of the first part will rotate the second part, a reversible electric motor operable to rotate an output shaft in both directions, a second gear train connecting the output shaft of the electric motor to the second part of the steering spindle whereby rotation of the output shaft by the electric motor will assist the rotation of the second part of the steering spindle, and means for controlling the operation of the electric motor in accordance with the torque reaction between members of the first-mentioned gear train connecting the two parts of the steering spindle.

2. A power-assisted steering mechanism according to claim 1 in which the said first gear train comprises two co-axial gear wheels of different sizes carried by a shaft which is parallel to the steering spindle, and connected rigidly together, which gear wheels respectively mesh with gear wheels on the two portions of the steering spindle, the said shaft being mounted in a member pivotable against spring means about the axis of the steering spindle, whereby the shaft and the member will be pivoted together about the said axis of the steering spindle in accordance with the torque reaction between the aforesaid gear wheels of the first-mentioned gear train, said pivotable movement controlling the operation of the electric motor.

3. A power-assisted steering mechanism according to claim 2 in which the said member carries a magnet which is initially located between and in equally spaced relation with two pole-pieces whereby said pivotal movement of the said shaft and the said member about the axis of the steering spindle will move the magnet towards one or other of the pole-pieces as the said torque reaction varies, movement of the magnet towards one of the pole-pieces operating the motor to drive its output shaft in one direction and movement of the magnet towards the other pole-piece operating the motor to drive its output shaft in the other direction.

4. A power-assisted steering mechanism according to claim 3 in which means are provided for making the electric motor inoperative when the steering spindle is rotated to a position approaching its full lock-position.

5. A power-assisted steering mechanism according to claim 4 in which the said means act to move the magnet away from the appropriate pole-piece to its initial or neutral position after the predetermined amount of rotation has taken place.

6. A power-assisted steering mechanism according to claim 4 in which a portion of the first part of the steering spindle is provided with a screw thread and in which the said means for making the electric motor inoperative comprise a bracket having an internally threaded bore in engagement with the screw thread on the spindle, and being held against substantial pivotal movement about the axis of the steering spindle whereby rotation of the spindle will move the bracket axially of the spindle so that the bracket, when moved in either direction of travel, engages a stop when the steering is near the respective full-lock position, pressure of the bracket on the stop rendering the motor inoperative and in which the magnet is carried on a bar which bar also carries the aforesaid stops, and is pivotally mounted on the said member in such a manner that when the bracket engages one of the stops, the bar pivots to move the magnet away from the appropriate pole-piece towards its initial or neutral position.

7. A power-assisted steering mechanism according to claim 2 in which the pivotable movement of the member about the axis of the steering spindle is restricted by limit stops.

8. A power-assisted steering mechanism according to claim 1 in which means are provided for making the electric motor inoperative when the steering spindle is rotated to a position approaching its full lock-position.

9. A power-assisted steering mechanism according to claim 8 in which a portion of the first part of the steering spindle is provided with a screw thread and in which the said means for making the electric motor inoperative comprise a bracket having an internally threaded bore in engagement with the screw thread on the spindle, and being held against substantial pivotal movement about the axis of the steering spindle whereby rotation of the spindle will move the bracket axially of the spindle so that the bracket, when moved in either direction of travel, engages a stop when the steering is near the respective full-lock position, pressure of the bracket on the stop rendering the motor inoperative.

10. A power-assisted steering mechanism according to claim 1 in which the electric motor is a pulse-controlled motor.

References Cited

UNITED STATES PATENTS

| | | | |
|---|---|---|---|
| 2,534,536 | 12/1950 | Staude | 74—388 |
| 2,587,377 | 2/1952 | Penrose | 74—388 |
| 2,756,605 | 7/1956 | Lincoln et al. | 74—388 |
| 2,869,383 | 1/1959 | Rapp et al. | 74—388 |

LEONARD H. GERIN, Primary Examiner

U.S. Cl. X.R.

180—79.1